United States Patent [19] [11] 4,259,588
Luckey et al. [45] Mar. 31, 1981

[54] GREEN-EMITTING X-RAY INTENSIFYING SCREENS

[75] Inventors: George W. Luckey, Rochester; Henry M. Cleare, Webster, both of N.Y.

[73] Assignee: Eastman Kodak Company, Rochester, N.Y.

[21] Appl. No.: 89,785

[22] Filed: Oct. 31, 1979

[51] Int. Cl.[3] ............ G01J 1/58
[52] U.S. Cl. ............ 250/483; 250/486
[58] Field of Search ............ 250/483, 486; 252/301.4 P, 301.4 S

[56] References Cited

U.S. PATENT DOCUMENTS

| | | | |
|---|---|---|---|
| RE. 21,216 | 9/1939 | Eggert et al. . | |
| 2,489,662 | 11/1949 | Murray . | |
| 3,883,747 | 5/1975 | Murashige et al. | 250/483 |
| 4,012,637 | 3/1977 | Swank | 250/483 |
| 4,070,583 | 1/1978 | Rabatin | 250/483 |

FOREIGN PATENT DOCUMENTS

| | | |
|---|---|---|
| 372827 | 2/1931 | United Kingdom . |
| 628847 | 9/1949 | United Kingdom . |

*Primary Examiner*—Bruce C. Anderson
*Attorney, Agent, or Firm*—J. Jeffrey Hawley

[57] ABSTRACT

Green-emitting x-ray intensifying screens which produce radiographs with improved visualization of objects having low x-ray contrast are disclosed. These screens contain an absorber which preferentially absorbs blue light, e.g., a yellow dye. A reflective support is used in particularly preferred embodiments.

9 Claims, No Drawings

GREEN-EMITTING X-RAY INTENSIFYING SCREENS

FIELD OF THE INVENTION

This invention relates to green-emitting x-ray intensifying screens. More particularly, the green-emitting screens of the present invention are relatively high in speed, while at the same time, they produce radiographs which exhibit improved visualization of objects having low x-ray contrast.

DESCRIPTION RELATIVE TO THE PRIOR ART

The use of fluorescent compositions in radiographic intensifying screens is well-known. The use of these compositions reduces the exposure of x rays required to produce a useable image on radiographic film. The intensifying screen absorbs the x rays and converts the x rays, through fluorescence, into energy to which the radiographic film is sensitive.

It is desirable to minimize the level of x-ray exposure which a patient might receive to an absolute minimum. Thus, it is common to use x-ray intensifying screens in pairs with film coated on both sides with silver halide, known in the art as "Duplitized" or "double-coated". In this configuration, one screen is placed in contact with one side of the double-coated film and the second screen is placed in contact with the other side. The x rays are absorbed by both phosphor layers and, as a result, this is an extremely sensitive configuration. The double-coated configuration, however, introduces a source of unsharpness due to what is called "crossover". Crossover exposure refers to the unsharpness which is produced by the emission from one screen traveling through the film support and exposing the nonadjacent silver halide layer.

Double-coated, as well as single-coated, configurations suffer from yet other sources of unsharpness when x-ray intensifying screens are used. The emission from a group of phosphor particles is isotropic. Only a portion of the light emitted from the particles moves in the direction of the x-ray film. The part of the emission reaching the film which moves in a direction which is not perpendicular to the x-ray film, that is, off-axis, contributes to "image-spreading" and a loss in sharpness of the image.

Numerous methods have been proposed for reducing the loss in sharpness which is caused by crossover and image-spreading. For example, crossover in double-coated film has been reduced by coating some sort of filter layer in the film element. It is known, for example, to include a dye which absorbs light of the same wavelength region emitted by the intensifying screen in the support or between the support and the silver halide emulsion layer. It has also been proposed to coat light-polarizing layers between the silver halide emulsion layers and the support. Three general solutions to the image-spreading problem within the screen are known. Image spread can be reduced by employing a very thin layer of the phosphor. Alternatively, image-spreading can be decreased by incorporating into the screen a dye which absorbs light which is emitted by the phosphor. Light emitted by the phosphor which is not directed toward the surface of the screen will travel through a greater amount of the dyed binder and will therefore be preferentially absorbed. Finally, the screen support can be made nonreflecting because light not perpendicular to the surface of the screen will have a tendency to reflect off a reflecting support and back onto the film at some distance from the phosphor particle. Thus, for optimum sharpness, the art teaches that reflecting supports should be avoided.

Each of the methods described for improving the sharpness of a screen-film combination has disadvantages. Where a dye which absorbs in the visible portion of the spectrum is added to the film to reduce the crossover exposure, it must be of a type which can be easily removed from the film because the presence of the dye in the completed radiograph could interfere with its evaluation. Also, any dye in the film must be compatible with the silver halide layer and processing solutions. These constraints limit greatly the dyes which can be incorporated into the film. Furthermore, the film portion of a film-screen combination is the nonreuseable portion. Thus, any additional component, such as a light-absorbing dye, adds to the complexity and cost of this component.

Each of the methods for reducing image spreading in an intensifying screen also has disadvantages. Thinning of the phosphor layer reduces the amount of phosphor which is subjected to x rays and thereby reduces the intensity and information content of the emission which results. This in turn requires the increasing of the x-ray dosage to which the patient is exposed. Thinning also increases an undesirable property typically referred to as "mottle". Incorporation of a dye into the phosphor screen, if too much is used, can also reduce the effective thickness of the screen. If nonreflective supports are used, not only are the off-axis light rays attenuated, but also the light which could be reflected back toward the film, thereby reducing the speed of the screen and its effective thickness.

Many modern x-ray intensifying screens use phosphors which emit predominantly in the green portion of the spectrum. By this it is meant that at least 30 percent of the total emission of the phosphor is in the region of the spectrum which lies between 500 and 600 nm. In U.S. Pat. No. 3,883,747, it is disclosed that the sharpness of an x-ray intensifying screen which contains a green-emitting phosphor can be improved by incorporating a small amount of a dye which preferentially absorbs green light. Specifically disclosed are terbium-activated, lanthanum and gadolinium oxysulfide screens which contain as little as 0.0003 percent by weight of the dye based on the amount of phosphor present. According to the teaching of this patent, the dye should be selected so that it has very little absorption in the blue portion of the spectrum. While green-emitting screens which contain a small amount of green dye or other absorber produce sharper radiographs than screens which do not contain such an absorber, further increases in sharpness, without undue loss in speed, or increases in mottle continue to be sought.

It would be particularly desirable if these objectives could be met and at the same time provide improvements in the visibility of objects with low x-ray contrast. For example, gallstones have very low x-ray contrast and are particularly difficult to see in radiographs made using conventional medium- or high-speed screens.

SUMMARY OF THE INVENTION

It has been found that green-emitting intensifying screens which produce radiographs exhibiting high visibility of objects with low x-ray contrast can be prepared by preferentially absorbing, not the green light, as taught by U.S. Pat. No. 3,883,747 cited above, but rather the blue light. This improvement is particularly surprising because it will be remembered that U.S. Pat. No. 3,883,747 teaches that the blue absorption of any green absorber should be minimal. According to the present invention, the absorber which is put into the screen produces a relatively high spectral density in the blue portion of the spectrum so as to decrease the blue emission while, at the same time, has sufficient density in the green portion of the spectrum so as to reduce the image-spreading of the green-light emission of the phosphor. In any event, the density in the blue must be greater than the density in the green; i.e., the absorber must preferentially absorb blue emission.

The light absorber need not be a single component and need not be all in the phosphor-containing layer. The phosphor-containing layer can contain a sufficient amount of a green absorber so as to reduce the image-spreading. The overall screen should contain enough of the blue absorber so as to decrease substantially the blue light emitted from the screen. Thus, two absorbers can be used with the green absorber being in the phosphor layer and the blue absorber being either in the phosphor layer or, for example, in an overcoat layer. Alternatively, a single blue absorber which has some green absorption can be used in the phosphor layer.

The amount of absorber which should be used in the screens of the present invention can be determined by making test coatings and measuring the radiance factor. The radiance factor of a material is measured using known methods which will be more fully described, but briefly is the ratio of the radiance of the material to the radiance of a perfectly reflecting diffuser indentically irradiated.

In one aspect of this invention, an improved x-ray intensifying screen is provided of the type which comprises a support having coated thereon a phosphor layer which comprises a binder and a phosphor having at least one major green emission maximum in the wavelength range between 500 and 600 nm and at least one major blue emission maximum in the wavelength range between 300 and 500 nm and having at least 30 percent of its visible and ultraviolet emission above 500 nm. The improvement is that the phosphor layer further comprises at least one light absorber such that at about the wavelength of the green emission maximum the radiance factor is at least 0.10 greater than the radiance factor at about the wavelength of the blue emission maximum and preferably at least 0.30 greater.

As noted above, the blue absorber can be in a separate layer of the screen, such as in an overcoat layer. In this embodiment, the radiance factor in the various portions of the spectrum should be the same as the radiance factor described above.

DETAILED DESCRIPTION OF THE INVENTION

The following description relates primarily to the preferred embodiments where the light-absorbing composition is included in the phosphor layer. It will be understood, as noted above, that the blue absorber can be in a separate layer. Further, the present detailed description relates primarily to general-purpose screens. It will be understood that variations can be made in the specific compositions disclosed for detail or ultrafast screens, as will be readily apparent to those skilled in this art.

It is preferred to include a combination of at least two absorbers in the phosphor layer. In this manner, the requirements for the different portions of the spectrum can be independently met. In one particularly preferred embodiment, sufficient carbon is added to the phosphor layer so as to meet the radiance-factor requirements of the green portion of the spectrum. This carbon will, of course, reduce to a certain extent the radiance factor in the blue portion of the spectrum. However, the radiance factor in the blue portion must be further reduced by incorporation into the phosphor layer of a yellow dye or other material which preferentially absorbs the blue emission of the phosphor of the screen.

When carbon is used as the absorber for the green portion of the spectrum in the phosphor layer, the radiance-factor requirements are met with extremely low levels of carbon. Typically, these requirements are met with about 0.000125 weight percent carbon based on the amount of phosphor present, although the amount can vary, for example, between 0.00004 percent and 0.0004 percent. Higher and lower concentrations can sometimes be used, depending upon the form of the carbon, the binder for the phosphor layer, the amount and type of blue absorber, and the like. Using the present specification as a guide, one of skill in the art can easily determine the proper amount of carbon to obtain the desired optical characteristics.

Any form of carbon can be used; however, it is preferred to use carbon which has been finely divided such as carbon black. While carbon black alone can be used, it has a tendency to clump. It is convenient, therefore, to use dispersed carbon such as carbon which has been dispersed in cellulose nitrate chips. Useful carbon-containing chips are available from PFD/Penn Color, Inc. Typically, the size of the carbon particles in these chips ranges from about 10 to about 50 mμ.

Other green absorbers are useful so long as the radiance-factor requirement of the phosphor layer in the green portion of the spectrum can be met. Useful absorbers include green dyes such as those described in U.S. Pat. No. 3,883,747 cited above.

The blue absorber can be any dye or pigment which, when added to the phosphor layer or when added to an overcoat layer, produces the desired radiance-factor difference. Particularly preferred are yellow dyes which are soluble in the solvent for the binder for the phosphor layer. One particularly preferred yellow dye is Dye #1 described below which is soluble in acetone. Useful dyes include dyes represented by the formulae:

Dye #1

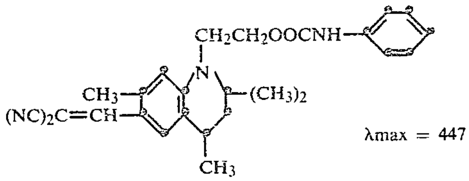

λmax = 447

Dye #2

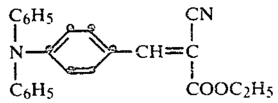

λmax = 425

-continued

Dye #3

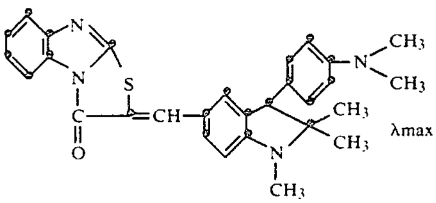

λmax = 460

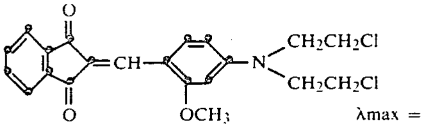

λmax = 475

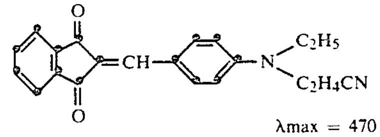

λmax = 470

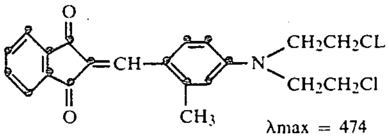

λmax = 474

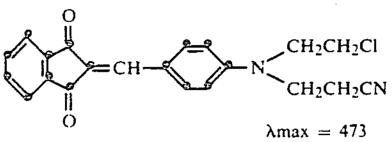

λmax = 473

These dyes are particularly useful with terbium-activated gadolinium phosphors. These phosphors have a green emission maximum at about 545 nm and blue emission maxima at about 440 and 490 nm. The above dyes were selected to have a high density near the 490-nm-emission maxima of this phosphor so that only a small amount of these dyes need be used to meet the blue transmission characteristics according to the present invention.

Where two different absorbers are used, it is desirable to select dyes which have high absorption in the blue portion of the spectrum and relatively low absorption in the green portion of the spectrum. Where one absorber is used, it is desirable to select a yellow dye which has some absorption in the green portion of the spectrum. The useful amount of dye will depend upon the particular dye, i.e., its extinction coefficient, the amount of absorption which the green absorber has in the blue portion of the spectrum, and the like. As an example, when Dye #1 is used as the blue absorber and carbon is used as the green absorber in a gadolinium oxysulfide terbium-activated screen, a useful concentration of the yellow dye in the phosphor layer is between about 0.01 percent and 0.02 percent by weight of the dye based on the weight of the phosphor present. It is generally desirable to have a relatively low concentration of carbon within these limits.

The exact amount of blue and green absorber can be determined by making a test coating and determining the radiance factor of the screen at the wavelengths of emission maxima of the phosphor. The radiance factor is the ratio of the radiance of the sample to the radiance of a perfectly reflecting diffuser identically radiated. In the case of fluorescent materials, the radiance factor is the sum of the reflected radiance factor and the fluorescent radiance factor. For the purpose of the present invention, the radiance factor is only the reflected portion. Interference by fluorescence can be minimized by using absorbers with low efficiency of fluorescence or by using monochromatic illumination where necessary. In examples, radiance factors were measured using a Carl Zeiss, Inc, DMC spectrophotometer equipped with a 45°/0° diffuse reflectance accessory. This equipment is described in detail in *The Proceedings of the 3rd Congress of the International Colour Association,* Troy, N.Y., July 10–15, 1977, F. W. Billmeyer and G. Wyszecki, eds, Adam Hilger, Ltd (1978), pages 232–236, the entire disclosure of which is hereby incorporated by reference. The samples were illuminated at 45° with a 250-watt xenon lamp and observed at 0°.

In measuring the radiance factors, the test coating should be coated on a support which does not absorb strongly in the wavelength regions in question. Various white supports can be used for this purpose provided they have reflectances above 80 percent. The thickness of the test coatings should be about 5 mils.

For medium-speed screens, a preferred embodiment of the present invention, the radiance factor at the wavelength of the green emission maximum should be between about 0.80 and 0.90. The radiance factor at the blue emission maximum should therefore be less than about 0.70 and preferably less than 0.50.

The screens of the present invention are typically used in pairs with film which has been double-coated. However, the screens of the present invention can also be used alone or in combination with conventional screens. One preferred combination is a screen of the present invention and another green-emitting screen, such as a similar screen not containing an absorber, a screen which contains only carbon and the like, used in conjunction with a green-sensitive double-coated film.

The light-absorbing composition, e.g., carbon and yellow dye, is preferably included in the coating composition for the phosphor layer. This coating composition comprises a binder, the phosphor, the light absorber and a suitable solvent for the binder.

The phosphors which are used in the screens of the present invention are phosphors which have a substantial portion of their visible and ultraviolet emission in the green portion of the spectrum. By "green portion of the spectrum" is meant the portion of the spectrum between about 500 and 600 nm. By "substantial proportion" is meant at least 30 percent of the total light of the emission of the phosphor. Many terbium-, dysprosium- and erbium-activated rare-earth phosphors are green-emitting phosphors within this definition. Particularly preferred phosphors are terbium-activated lanthanum and gadolinium oxysulfides and oxyhalides. These phosphors can be further identified by reference to the following formulae:

$Ph_2O_2Ch:A$ $PhOX:A$ $Ph_2O_3:A$ in which A is an activator trivalent rare-earth metal ion selected from the group consisting of terbium, dysprosium and erbium and is present in the phosphor in an activating concentration such as between about 0.1 to 10 mole percent based on the Ph present; X is halide such as chloride or bromide; Ph is selected from the group consisting of lanthanum, yttrium, gadolinium or lutetium; and Ch is a chalcogen such as sulphur or selenium, but not oxygen. These phosphors are well-known and are made by methods which are known in the art. Illustrative phosphors and methods for making them are described, for example, in U.S. Pat. Nos. 3,418,246, 4,107,070 issued Aug. 15, 1978, to Everts et al, 3,705,858 issued Dec. 12, 1972, to Luckey et al, 3,607,770 issued Sept. 21, 1971, to Rabatin, 3,591,516 issued July 6, 1971, to Rabatin, and the like.

Many of the above-described phosphors have considerable emission in the blue portion of the spectrum and screens made from these phosphors are considerably improved by the blue absorber described above. For example, one highly advantageous phosphor is terbium-activated gadolinium oxysulfide. This phosphor has major emission lines at about 545 nm (in the green portion of the spectrum) and at about 490 nm (in the blue portion of the spectrum). The spectral density curve of a typically used Duplitized x-ray green-sensitive film shows a spectral density minimum between about 450 and 525 nm and a spectral density peak near about 545 nm. Because of the relatively high spectral density of the film near 545 nm, relatively little of the 545-nm emission of the phosphor passes through the film to cause undesirable crossover. Thus, the screen need contain only enough green absorber to control image-spread. Conversely, because of the relatively low spectral density of the film near 490 nm, the 490-nm emission of the phosphor readily passes through the film to cause undesirable crossover. Therefore, it is desirable that the screen contain enough blue absorber to control the crossover exposure. For a screen containing terbium-activated gadolinium oxysulfide phosphor, it is preferred that the blue absorber have a very high extinction coefficient at 490 nm.

The blue absorber-containing screens of the present invention are particularly useful with silver halide films having low spectral density in the blue portion of the spectrum. For example, while a typical double-coated green-sensitive x-ray film has a relatively low density at about 490 nm, its density is fairly high at other wavelengths corresponding to the emission spectra of terbium-activated gadolinium oxysulfide. Thus, this film has sufficient density at 416 and 380 nm to reduce substantially any crossover caused by emissions at these wavelengths. However, other silver halide films, such as films having a relatively low silver halide coverage or different silver halide mole percent ratios, grain-size distributions or grain morphologies, etc., may have low optical density at these wavelengths, as well as at about 490 nm. A yellow dye with a broad absorption spectrum or a combination of several yellow dyes would be desirable for screens used with these films.

The phosphors which are useful in the screens of the present invention typically have emission spectra which are characterized by groups of lines at various wavelengths in the spectrum. "Major emission maxima" is meant to refer to comparatively intense lines. Frequently, the spectra will have a few intense lines and numerous smaller lines. Major emission maxima are typically two or three times larger than the smaller lines.

In the phosphor layers of the present invention, the phosphor particles are dispersed or suspended in a suitable binder. Useful binders include sodium o-sulfobenzaldehyde acetal of poly(vinyl alcohol), chlorosulfonated polyethylene, a mixture of macromolecular bisphenol polycarbonates and copolymers comprising bisphenol carbonate and poly(alkylene oxides), aqueous ethyl alcohol-soluble nylon, poly(ethyl acrylate-co-acrylic acid), or a combination of alkyl methacrylate polymer and a polyurethane elastomer. These and other useful binders are disclosed in U.S. Pat. Nos. 2,502,529, 2,887,379, 3,617,285, 3,300,310, 3,300,311 and 3,743,833 and in *Research Disclosure*, vol. 154, item 15444, February, 1977, and vol. 182, item 18269, June, 1979. The entire disclosure of these references is hereby incorporated by reference. Useful solvents for these binders are disclosed in these references.

Particularly preferred binders are polyurethanes. Useful binders of this type are commercially available under the Estane trademark from Goodrich Chemical Co.

X-ray intensifying screens comprising the phosphor-binder composition containing the light absorbers according to the present invention are preferably made by coating the phosphor-binder combination on a suitable support. Useful phosphor-to-binder ratios, coverages and supports can be found in the above-identified references which relate to the useful binders and phosphors. The preferred phosphor-to-binder volume ratio of the screens of the present invention is between about 0.8/1 to about 4/1. A particularly preferred phosphor-to-binder volume ratio is between 2/1 and 3/1. The preferred coverage of the phosphor layer is between about 50 $g/ft^2$ and about 65 $g/ft^2$ when a gadolinium oxysulfide phosphor is used. Particularly preferred results are obtained when the coverage is about 57 $g/ft^2$. Because the light absorber is such a small percentage of the phosphor layer, the described coverage is based on the amount of phosphor and binder.

The screens according to the present invention are optionally overcoated with a protective coating to provide desirable resistance to the effects of humidity, scratches and the like. Particularly useful layers are of cellulose acetate. While the blue absorber according to the present invention can be included in this overcoat layer, it is preferred to introduce the blue absorber only in the phosphor layer, because the overcoat layer can become scratched, thereby removing the absorber from that portion of the surface corresponding to the scratch. However, when the blue absorber also is in the overcoat layer, it is typically present in an amount somewhat lesser than when it is in the phosphor layer because the overcoat layer is typically much thinner than the phosphor layer. This overcoat layer for the screen also optionally contains addenda such as matting agents and the like. Useful matting agents are described below in relation to the silver halide elements used with these screens.

The x-ray screens according to the present invention are prepared by coating the phosphor layer on a suitable support. Typical screen supports are cellulose esters such as cellulose acetate, poly(vinyl acetate), polystyrene, poly(ethylene terephthalate), and the like. Supports such as cardboard or paper which are coated with α-olefin polymers, particularly polymers of α-olefins containing two or more carbon atoms, for example, polyethylene, polypropylene, ethylene-butylene copolymers and the like, can be used. Other useful supports include metals such as aluminum and the like.

Reflective supports are optionally used with great advantage with the blue absorber-containing phosphor layers to optimize the speed/sharpness/quantum mottle characteristics of the screens of the present invention. The reflective support can be used to restore some of the speed and reduce some of the quantum mottle which might be introduced by incorporating the blue absorber.

Useful reflective supports are made by dispersing a reflective material, for example, titanium dioxide, in the polymeric supports mentioned above, or by coating a layer of titanium dioxide or similar reflecting pigments on top of the support. Other particularly preferred reflective supports include reflective papers such as baryta-coated paper and the like.

The x-ray screens according to the present invention emit primarily in the green portion of the spectrum. These screens are therefore used to advantage with green-sensitive recording elements. Particularly useful elements have coated thereon silver halide layers, particularly layers of silver bromide. (A general disclosure relating to the silver halide elements can be found in *Research Disclosure*, Volume 176, item 17693, December, 1978.) The silver halide can comprise varying amounts, however, of silver chloride, silver iodide, silver bromide, silver chlorobromide, silver bromoiodide and the like. Useful silver halide layers include gelatino silver bromoiodide emulsions in which the average grain size of the silver bromoiodide crystals is in the range of about 0.5 to about 5 microns. When a Duplitized silver halide element is employed (a support coated on both sides with silver halide), the total silver coverage per unit area for both coatings will be preferably less than about 0.080 g/dm$^2$. Preferably, each coating will contain less than about 0.040 g/dm$^2$. These layers are applied to a suitable photographic support by means which are well-known in the art. Silver halides used in radiographic recording layers are typically coarse-grained silver halide emulsions; however, fine-grained emulsions can be used alone or in a blend with coarse-grained emulsions to provide extended exposure latitude or improved covering power. The emulsions can be surface-sensitive emulsions or predominantly emulsions which form latent images primarily in the interior of the silver halide grains. Illustrative examples of useful emulsions are those emulsions described in U.S. Pat. Nos. 3,979,213, 3,772,031, 3,761,276, 3,767,413, 3,705,858, 3,695,881, 3,397,987, 2,996,382, 3,178,282 and 3,316,096.

In addition to reducing the crossover exposure by incorporating a blue absorber in the screen, the x-ray recording film optionally contains dyes or other means to reduce the crossover exposure. Crossover exposure can be reduced by coating a light-polarizing layer between the silver halide emulsion layer and the support, as is taught in *Research Disclosure*, volume 146, item 14661, June, 1976; coating a removable absorbing dye, compound or filter dye layer which absorbs light in the green portion of the spectrum; adding an absorbing compound to the film support; and the like.

As noted, the screens of the present invention are particularly preferred with green-sensitive elements. As is well-known in the art, silver halide can be spectrally sensitized to green light by incorporating a green-sensitizing dye. Particularly useful green-sensitizing dyes are the oxacarbocyanine and thiacarbocyanine dyes such as those described in U.S. Pat. No. 2,503,776. Other useful sensitizing dyes are referenced in the silver halide *Research Disclosure*, cited above, at paragraph IV.

The photographic elements which are useful with the screens of the present invention also optionally contain matting agents. The matting agent is typically included in an overcoat layer for the photographic emulsion for the purpose of improving the physical properties of the element, such as scratch, pressure and static resistance and the like. Particularly preferred matting agents are finely divided organic particles or beads such as polymeric beads derived from acrylic and methacrylic acids and their methyl esters. These and other useful matting agents are referenced in the silver halide *Research Disclosure*, cited above, at paragraph XVI.

Silver halide elements and methods for preparing and processing these elements, which are particularly suited to radiography, are described in *Research Disclosure*, Volume 184, item 18431, August, 1979. The entire disclosure of this *Research Disclosure* and the silver halide *Research Disclosure* cited above are hereby incorporated by reference.

The following examples are presented to illustrate the invention.

EXAMPLES 1-3

These examples illustrate the advantage of screens of the present invention in comparison with similar screens which do not contain the selective absorbers as described herein.

A $Gd_2O_2S$:Tb phosphor was prepared by methods which have been described in U.S. Pat. No. 3,418,246, then ground and refired by the method described in U.S. Pat. No. 4,107,010. The particle-size distribution of the phosphor was such that the average crystal size was about 6–10μ.

Estane 5707 F1 polyurethane binder, obtained from B. F. Goodrich Chemical Co., Cleveland, Ohio 44131, was dissolved in tetrahydrofuran. The coatings described in Table 1 were prepared by adding the oxysulfide phosphor to this solution of binder, then stirring vigorously. When carbon was used in the coating, it was added before the phosphor, and when dye was used, it was added after the phosphor. The mixture was stirred vigorously after each addition, then permitted to deaerate before coating. The carbon was added in the form of a chip which contained about 25% carbon and the remainder plasticizer and cellulose nitrate binder, sold by Penn Color, Inc., under the name D. C. Glo-Blak. The dye was Dye #1 described earlier. The amounts of carbon reported in Table 1 are reported as the amount of carbon only; the chip concentration is four times greater. Sizes of the carbon particles range from about 10 to 50 mμ.

The coatings were made on subbed poly(ethylene terephthalate). One of the supports, designated "white support" in Table 1, contains $TiO_2$ in a concentration of 7.5% by weight to reflect a substantial fraction of the incident visible light. All screens were overcoated with 0.3 mil of cellulose acetate.

Radiographs were made with the screens described in Table 1 using a green-sensitized coarse-grained silver bromoiodide gelatino emulsion coated on both sides of a poly(ethylene terephthalate) support. In making these radiographs, the screens were placed on both sides of the film in a vacuum cassette, then the combination was exposed to x rays from a tungsten target tube operated at 70 kVp which were filtered with ½ mm of copper and 1 mm of aluminum. After exposure, the film was processed in a conventional manner. The speeds of the screen-film combinations were measured at a developed density of 0.85 above gross fog.

The speed of these film-screen combinations is given in Table 1 relative to the speed of two $CaWO_4$ duPont Par Speed ® screens used with a conventional blue-sensitive film processed in a conventional manner. Differences in speed are in terms of log exposure.

Sharpness is a subjective evaluation. To test sharpness, a radiograph was made of a test object comprising bone and steel wool. Similarly, "mottle" and "bead visibility" are subjective evaluations. For these evaluations, 1" of Lucite is placed between the x-ray source and the test object in order to introduce scattering and improve the sensitivity of the evaluation to differences. "Mottle" is an evaluation of the graininess caused by the screen. "Bead visibility" is an evaluation of the visibility in the radiograph of a test object which has low x-ray contrast—in this case, poly(methyl methacrylate) beads which are of a variety of sizes from about 1/32" to ⅛" in diameter.

The subjective quality measurements were made by observers who are skilled in evaluating radiographs. In some cases, several radiographs form the basis for a single evaluation. In all cases, the evaluation is a comparison with radiographs made using two duPont Par Speed screens and a conventional blue-sensitive film under the same conditions. The assessments have the following meanings:

++: much better
+: better
±: slightly better
0: about the same
≈: slightly worse
−: worse
−−: much worse As noted, the phosphor used is terbium-activated gadolinium oxysulfide. This phosphor has major emission maxima at about 490 nm and about 545 nm so that the radiance factor for these screens is given in Table 1 at these wavelengths.

The amounts of phosphor and binder are given in Table 1 in terms of parts (pts) by weight. The percentage dye or carbon is the weight percent based on the amount of phosphor present. For this phosphor and this binder a weight ratio of 15/1 corresponds to a volume ratio of 2.5/1.

TABLE 1

| | | Radiance Factor | | Relative | Bead | | |
|---|---|---|---|---|---|---|---|
| | | 490 | 545 | Speed | Visibility | Sharpness | Mottle |
| Example 1 | 14 pts phosphor, 1 pt binder, .01% dye, .000125% carbon, coverage 55 g/ft²) white support | .51 | .82 | +.29 | + | − | ≈ |
| Example 2 | 14 pts phosphor, 1 pt binder, .01% dye, coverage 53 g/ft², white support | .53 | .88 | +.36 | ± | − | ≈ |
| Example 3 | 15 pts phosphor, 1 pt binder, .01% dye, coverage 62 g/ft², clear support | .60 | .84 | +.28 | + | ≈ | ≈ |
| comparative example | 14 pts phosphor, 1 pt binder, .00037% carbon, coverage 51 g/ft², white support | .74 | .76 | +.34 | 0 | − | − |
| comparative example | duPont Par Speed | − | − | 0 | 0 | 0 | 0 |

EXAMPLES 4–7

The procedure of Examples 1–3 was repeated except that a variety of dyes were used. The results are summarized in Table 2.

TABLE 2

| | | Radiance Factor | | Relative | Bead | | |
|---|---|---|---|---|---|---|---|
| | | 490 | 545 | Speed | Visibility | Sharpness | Mottle |
| Example 4 | 15 pts phosphor, 1 pt binder, .01375% dye No 1, .0001375% carbon, coverage 58 g/ft², white support | .47 | .82 | +.30 | ++ | − | + |
| Example 5 | 15 pts phosphor, 1 pt binder, .0025% dye No 1, coverage 61.4 g/ft², clear support | .68 | .82 | +.30 | ++ | ≈ | ≈ |
| Example 6 | 15 pts phosphor, 1 pt binder, .02% dye No 3, coverage 60 g/ft², white support | .35 | .86 | +.33 | ++ | − | ++ |
| Example 7 | 15 pts phosphor, 1 pt binder, .000125% carbon, .01% dye No 2, coverage 58 g/ft², white support | .58 | .85 | +.37 | ++ | − | + |
| comparison | 14 pts phosphor, 1 pt binder, .00025% carbon, coverage 51.1 g/ft², clear support | .74 | .75 | +.30 | ± | ≈ | − |
| comparison | 15 pts phosphor, 1 pt binder, .000125% carbon, coverage 60.3 g/ft², clear support | .79 | .80 | +.37 | + | ≈ | 0 |
| comparison | 15 pts phosphor, 1 pt binder, coverage 68.7 g/ft², white support | .83 | .85 | +.53 | 0 | − | + |

The invention has been described in detail with particular reference to preferred embodiments thereof, but it will be understood that variations and modifications can be effected within the spirit and scope of the invention.

We claim:

1. In an x-ray intensifying screen comprising a support having coated thereon a phosphor layer which comprises a binder and a phosphor having at least one major green emission maximum in the wavelength range between 500 and 600 nm and at least one major blue emission maximum in the wavelength range between 300 and 500 nm and having at least 30 percent of its visible and ultraviolet emission above 500 nm, the improvement wherein said phosphor layer further comprises at least one light absorber such that at about the wavelength of said green emission maximum the radiance factor of said screen is at least 0.10 greater than the radiance factor at about the wavelength of said blue emission maximum.

2. The screen according to claim 1 wherein the radiance factor of said screen at about the wavelength of said green emission maximum is at least 0.30 greater than the radiance factor at about the wavelength of said blue emission maximum.

3. The screen according to claim 1 wherein said absorber comprises a yellow dye.

4. The screen according to claim 1 wherein said absorber comprises a yellow dye and carbon.

5. The screen according to claim 1 wherein said support is a reflecting support.

6. The screen according to claim 5 wherein said reflective support comprises titanium dioxide dispersed in poly(ethylene terephthalate).

7. The screen according to claim 1 wherein said phosphor is a terbium-activated gadolinium oxysulfide phosphor.

8. The screen according to claim 1 wherein said binder is a polyurethane binder.

9. In an X-ray intensifying screen comprising a support having coated thereon a phosphor layer which comprises a binder and a phosphor having at least one major green emission maximum in the wavelength range between 500 and 600 nm and at least one major blue emission maximum in the wavelength range between 300 and 500 nm and having at least 30 percent of its visible and ultraviolet emission above 500 nm, the improvement wherein said phosphor layer further comprises at least one light absorber such that the radiance factor at about the wavelength of said green emission maximum is between about .80 and .90 and the radiance factor at said blue emission maximum is less than about .50.

* * * * *